July 7, 1959 F. IGNATJEV 2,894,162
SPARK PLUG FOR INTERNAL COMBUSTION ENGINES
Filed Nov. 18, 1957
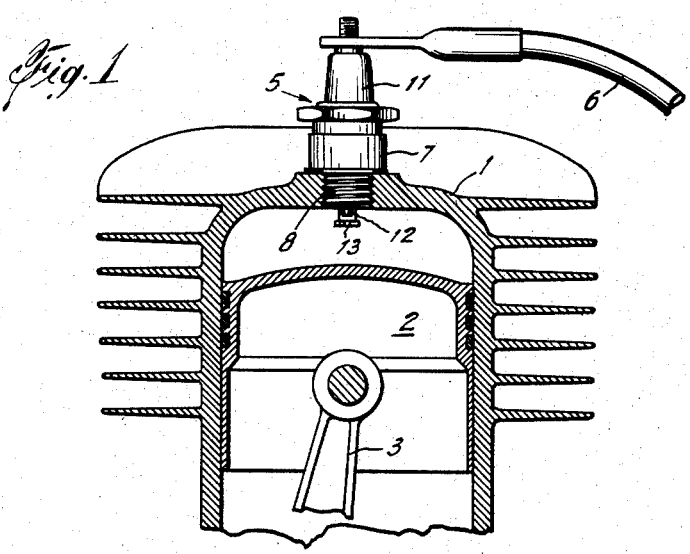
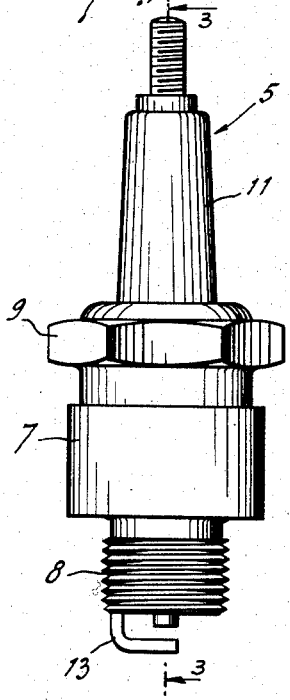
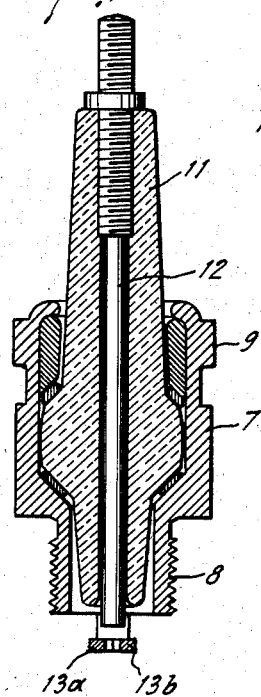
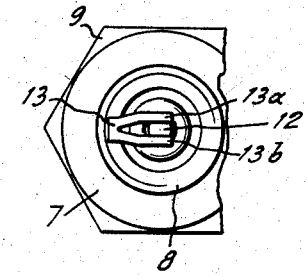
INVENTOR.
Feodor Ignatjev

United States Patent Office 2,894,162
Patented July 7, 1959

2,894,162

SPARK PLUG FOR INTERNAL COMBUSTION ENGINES

Feodor Ignatjev, East Norwalk, Conn.

Application November 18, 1957, Serial No. 697,192

4 Claims. (Cl. 313—141)

This application relates to an electrical igniting device such as a spark plug as employed for igniting the air gas mixture in the combustion chamber of an internal combustion engine, the invention more particularly relating to an improved structural form and relative physical arrangement in the electrode elements of the device.

The conventional form of spark plug now employed in internal combustion engines comprises, basically, a shell or casing having a cylindrical fitting which is threaded to permit the plug to be removably inserted in the cylinder head of an engine. Disposed centrally of the shell is an electrode surrounded by insulating means, both ends of said electrode extending beyond the insulating means with one end disposed within the combustion chamber and the other end being adapted for connection to a wire leading to a source of high potential. The other electrode of the plug, which together with the central electrode defines a spark gap, extends radially from the shell of the plug to a position spaced from said insulated electrode. Said other electrode is electrically connected to the shell of the plug and serves as a ground for the high voltage circuit which runs through the shell of the plug to the body of the engine itself. The central electrode will hereinafter also be referred to as the source electrode, and the other electrode connected to the shell of the spark plug will be hereinafter referred to also as the ground electrode.

It is believed to be generally recognized that ideal combustion exists only when ignition of the charge starts at the point of the spark generated by the spark plug and travels rapidly but with a definite wave front throughout the entire charge. Failure of any portion or area of the charge to ignite in accordance with the ideal progression of the combustion wave front throughout the combustion chamber results in proportional losses of power or energy transmitted to the piston. The problem of attaining this idealized combustion is becoming more acute as engines are being developed for operating at higher compression ratios and at higher temperatures, since at these higher ratios and temperatures there is a greater tendency of the charge or a portion thereof to preignite or detonate. Detonation reduces power output, causes overheating, unduly stresses the cylinder head and the moving parts operating therein and is generally objectionable from the noise and vibration standpoint. Detonation is belived to result from a portion of charge being compressed into a pocket and igniting spontaneously from adiabatic compression in advance of the time it would otherwise be ignited according to the ideal progression of the combustion wave front.

It is beileved that one of the factors which has contributed largely to the problem of uneven rate of combustion and consequent uneven pressure on the piston head has been the structural form and disposition of the ground electrode of the spark plug. In the type of plugs most commonly used in automotive engines a single ground electrode is employed, it extending longitudinally from the bore of the plug shell and being bent substantially at right angles so as to extend radially to a point underlying the centre of source electrode at a specified gap distance axially with respect to the source electrode. With this configuration, the ground electrode acts as a physical barrier between the spark gap and a large area of the combustion chamber. Consequently, the combustion wave front originating within the spark plug is unable to reach a large area of the combustion chamber directly but rather only indirectly because of the physical barrier presented by the ground electrode. Other forms of plugs employ a plurality of ground electrodes, and this is particularly prevalent in spark plugs intended for use in aircraft engines, but since a spark will traverse only one gap at a time the net result of the additional electrodes is to present additional barriers to the progression of the combustion wave front throughout the entire area of the combustion chamber.

Accordingly, the ground electrode of the plug in accordance with the present invention is so designed and disposed as to directly expose the greatest possible area of the combustion chamber to the point of the spark thereby presenting a minimum barrier to the even and steady progression of the combustion wave front throughout the chamber. This is achieved through the use of a single ground electrode which, however, does not underlie the entire tip area of the source electrode but rather is bifurcated to form electrode tips each having no more than half the cross sectional area of the usual ground electrode, the two tips forming therebetween a gap which permits a greater area of the combustion chamber to be directly exposed to the spark travelling between one of the tips and the source electrode.

It is therefore an object of the invention to achieve more efficient combustion in an internal combustion engine.

It is a further object of the invention to achieve, through improved electrode design, a more even rate of combustion of a charge within an internal combustion engine.

An additional object of the invention is to provide a spark plug which will directly expose a spark to a greater area of the combustion chamber in which it is located.

Still further objects of the invention together with the features contributing thereto and advantages accruing therefrom will be apparent from the following description when read in conjunction with the drawings wherein:

Fig. 1 is a cross sectional view of the combustion chamber of an internal combustion engine showing a typical arrangement of spark plug in relation thereto.

Fig. 2 is an elevation of a spark plug according to the instant invention.

Fig. 3 is a sectional view of the spark plug taken along lines 3—3 of Fig. 2.

Fig. 4 is an enlarged bottom view of the spark plug showing in particular the configuration of the improved ground electrode.

As can be seen in Fig. 1 the head portion of an engine cylinder comprises a combustion chamber which is the area defined by the walls 1 of the cylinder and the upper face of a piston 2 reciprocating within the confines of the cylinder. Combustion of fuel, introduced into the cylinder and compressed in the combustion chamber by the upward thrust of the piston, exerts a downward force on the piston which in turn is transmitted through a connecting rod 3 to rotate a crank shaft, not shown. The compressed fuel is ignited through the intermediary of a spark plug 5 which is secured at a suitable location in the cylinder head, the plug being electrically connected to a source of high voltage through an ignition wire 6.

As can be best seen in Figs. 2 and 3, the general construction of the spark plug comprises a supporting body or shell 7 made of a suitable conducting metal and formed in an open and substantially cylindrical shape. The lower extremity or shank 8 of the shell is threaded to enable insertion of the plug in a correspondingly threaded opening of the cylinder head. The upper portion 9 of the shell is in the form of a multi-faced nut to facilitate application of a wrench for the purpose of inserting or removing the plug from the cylinder head.

Supported within the shell of the plug is an insulator 11 which may be formed of porcelain or the like, the insulator in turn containing a conductor 12 constituting one of the electrodes of the spark plug. Electrode 12, at each end thereof, projects beyond the confines of the insulator 11 with the upper end of the electrode being formed with means, such as threads or the like, to permit joinder and electrical contact with a suitable fitting provided on the aforementioned ignition wire 6.

The outer or ground electrode 13 is joined to the bottom face of the shank portion 8 of the plug and comprises an extrusion of suitable conducting metal bent over to extend inwardly and radially relative to the shank of the plug, the bent over portion of the electrode being bifurcated, as best seen in Figs. 3 and 4, so as to provide a plurality of electrode tips 13a, 13b each defining a spark gap of substantially equal width with the lower end of the center or source electrode 12. The two electrode tips 13a, 13b lie in diametrically opposed relation to the axis of the center electrode 12 and are preferably offset relative thereto substantially the same extent.

In engine operation, it being understood that the high potential source is grounded to the body of the engine, each time that the plug is caused to fire at a predetermined point of a cycle as may be adjusted by distributor mechanism not shown, a spark is caused to jump between the source electrode 12 and either one of the ground electrode tips 13a, 13b. Under normal conditions the spark alternates between the two ground electrode tips during successive firings of the plug. In view of the alternating firing of the spark, it will be apparent that each of the electrode tips 13a, 13b need have no more than half the cross sectional area of a conventional non-bifurcated electrode to achieve the same life expectancy of such conventional form of electrode. It will further be apparent that the space between the two electrode tips 13a, 13b permits direct exposure of the spark to the area of the combustion chamber directly beneath the plug, which is generally the central area of the combustion chamber, regardless of which of the two electrode tips is effective for any one firing. It will be still further apparent that by providing two spaced electrode tips of reduced cross sectional area, one of which in each firing being spaced from and out of line of the spark, the area portion of the combustion chamber shielded from direct exposure to the spark will be substantially reduced. Accordingly, since the tips are spaced apart, the respective shielded areas of the combustion chamber will be correspondingly spaced apart or separated so as to prevent any one substantially large or concentrated area of the combustion chamber from being shielded from the spark as is the case with the conventional form of ground electrode. As a result, combustion is able to proceed with a more even and uniform wave front throughout the entire area of the combustion chamber enabling spark timing to be advanced to a more advantageous point of the cycle and thereby generally accomplishing more efficient combustion with correspondingly increased power output from the cylinder.

While there has been shown and described herein what is believed to be a preferred embodiment of the invention, it is obvious that changes in form could be made without departing from the spirit of the invention, and it is, therefore, intended that the invention be not limited to the exact form herein shown and described nor to anything less than the whole of the invention as hereinbefore set forth and as hereinafter claimed.

What is claimed is:

1. In a spark plug of the character described for igniting the fuel charge of an internal combustion engine and having a cylindrical shell of conducting material supporting a longitudinal coaxially disposed electrode insulated therefrom, a second electrode connected to said shell and radially disposed to complete a spark circuit with a terminal end of said first mentioned electrode, said second electrode being furcated to form laterally spaced electrode tips each longitudinally spaced beyond and defining a spark gap of substantially the same width with said terminal end of the first mentioned electrode.

2. In a spark plug of the character described for igniting the fuel charge of internal combustion engines and having a cylindrical shell of conducting material adapted for attachment in the cylinder head of said engine, a longitudinal coaxially disposed source electrode insulated from and supported by said shell and connectable at one end to a source of high potential, and a single ground electrode connected to said shell and radially disposed to complete a spark circuit with the other end of said source electrode, said ground electrode being furcated to form laterally spaced tips longitudinally spaced beyond and defining spark gaps of substantially the same width with said other end of the source electrode.

3. The invention according to claim 2 wherein the furcate portion of said ground electrode consists of two laterally spaced electrode tips.

4. The invention according to claim 3 wherein said laterally spaced electrode tips lie in opposed relation to the axis of said source electrode, said tips being laterally offset to the same extent relative to the longitudinal axis of said source electrode.

References Cited in the file of this patent

UNITED STATES PATENTS

| | | |
|---|---|---|
| 1,564,645 | Thomas | Dec. 8, 1928 |
| 1,912,516 | Davis | June 6, 1933 |
| 2,469,304 | Lukeman | May 3, 1949 |